UNITED STATES PATENT OFFICE.

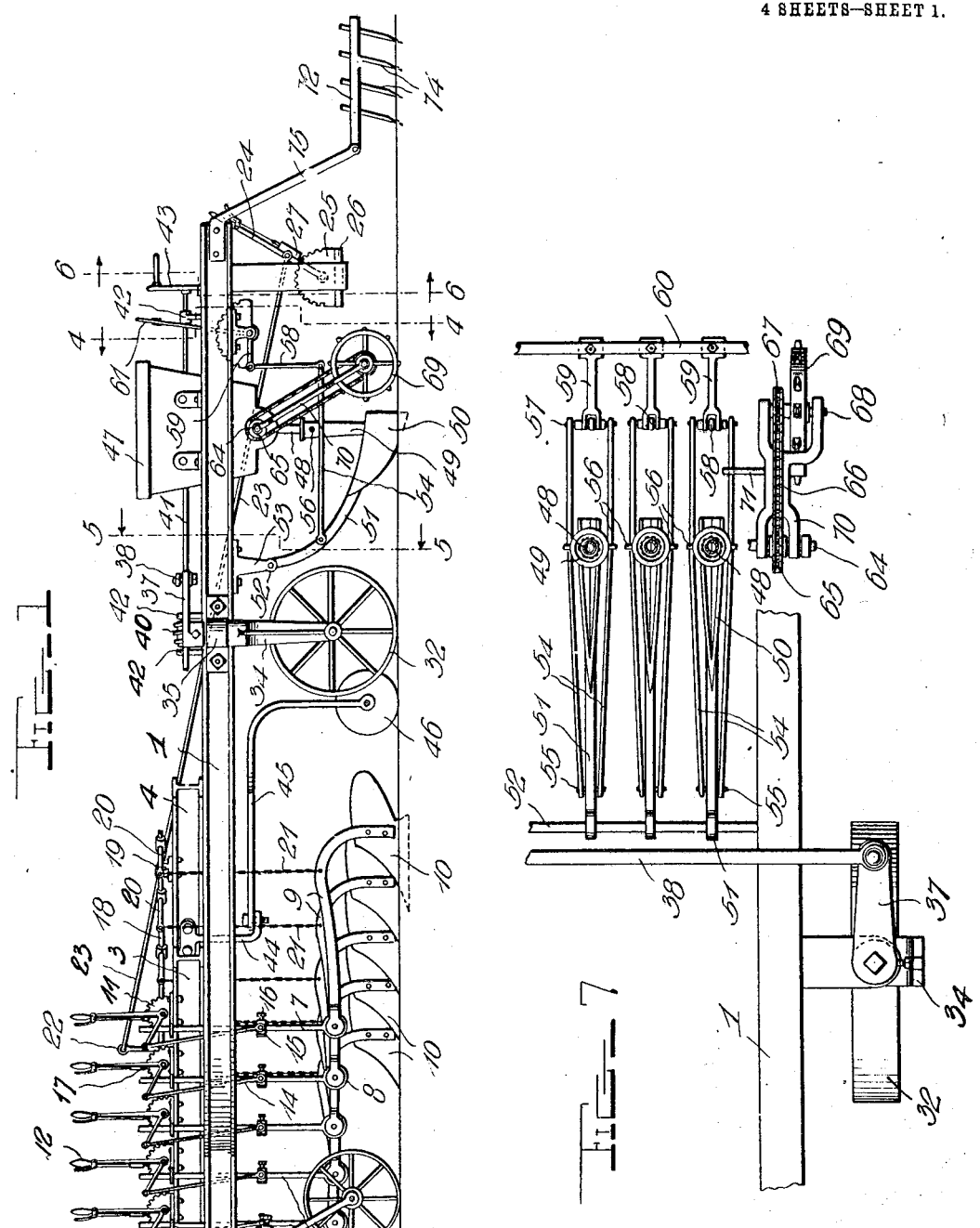

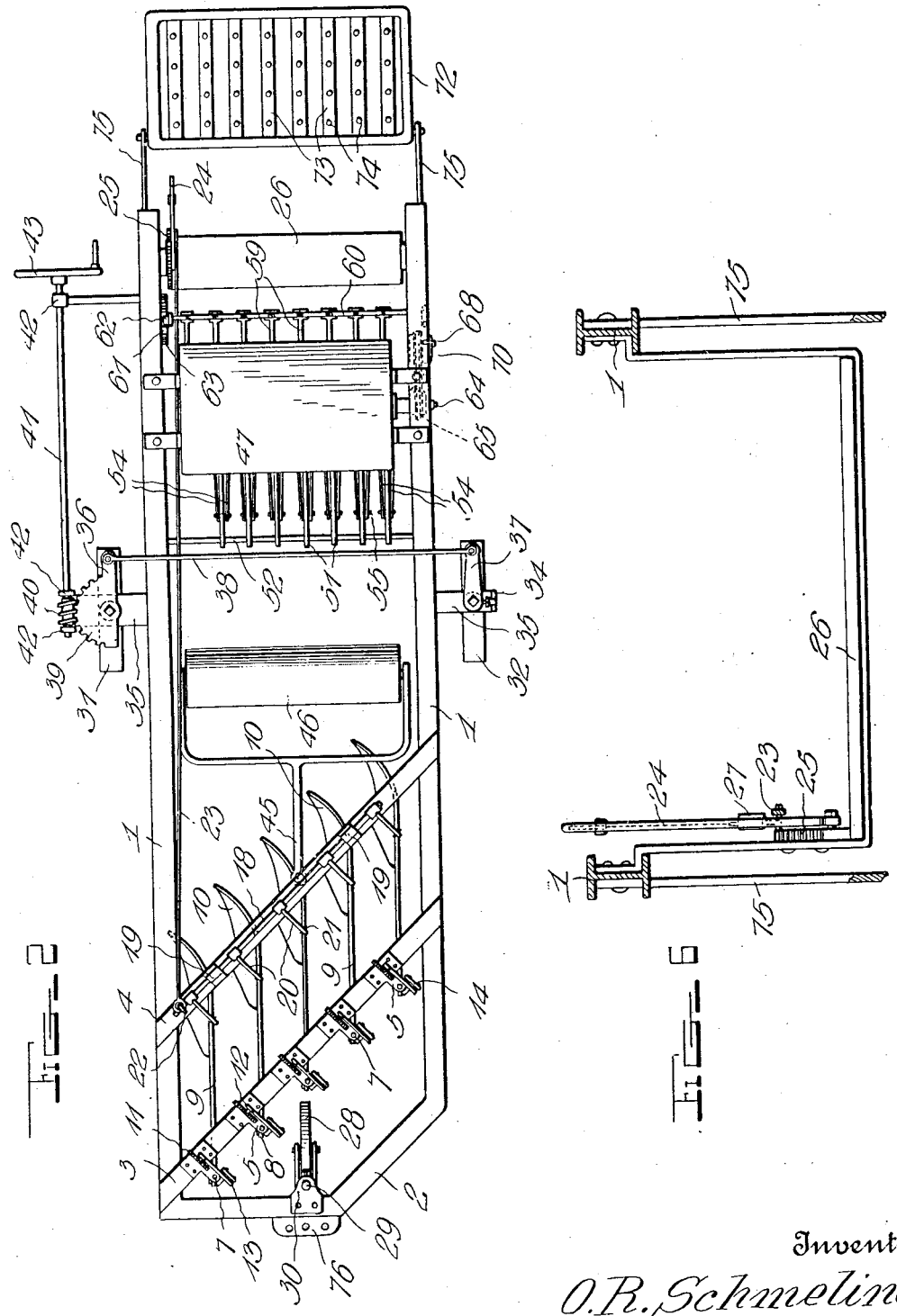

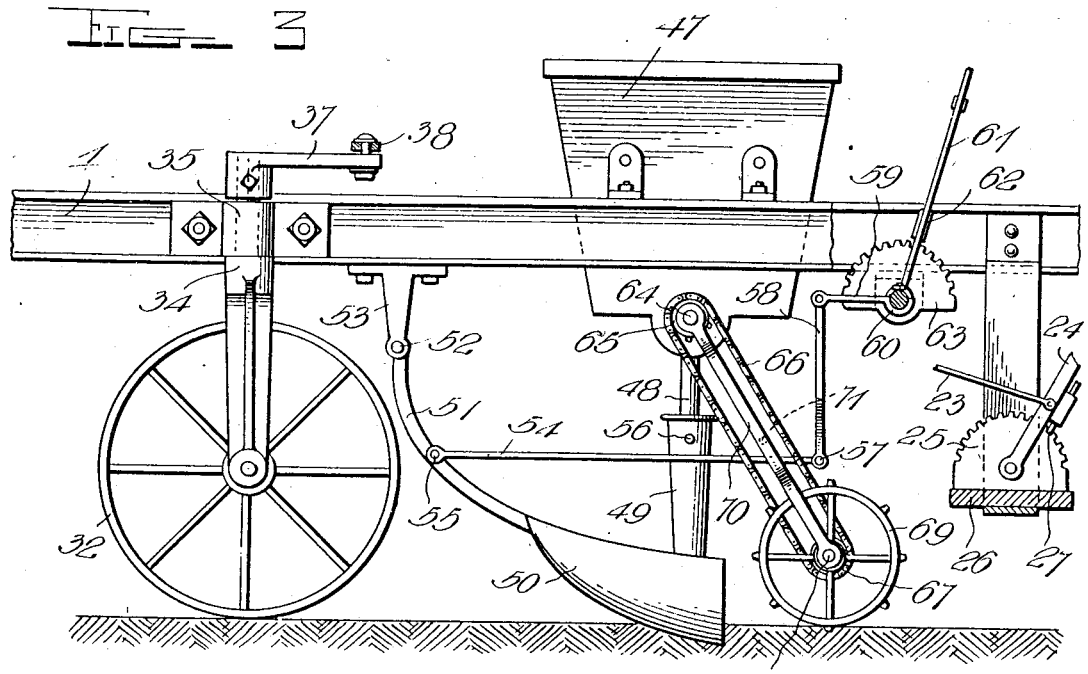

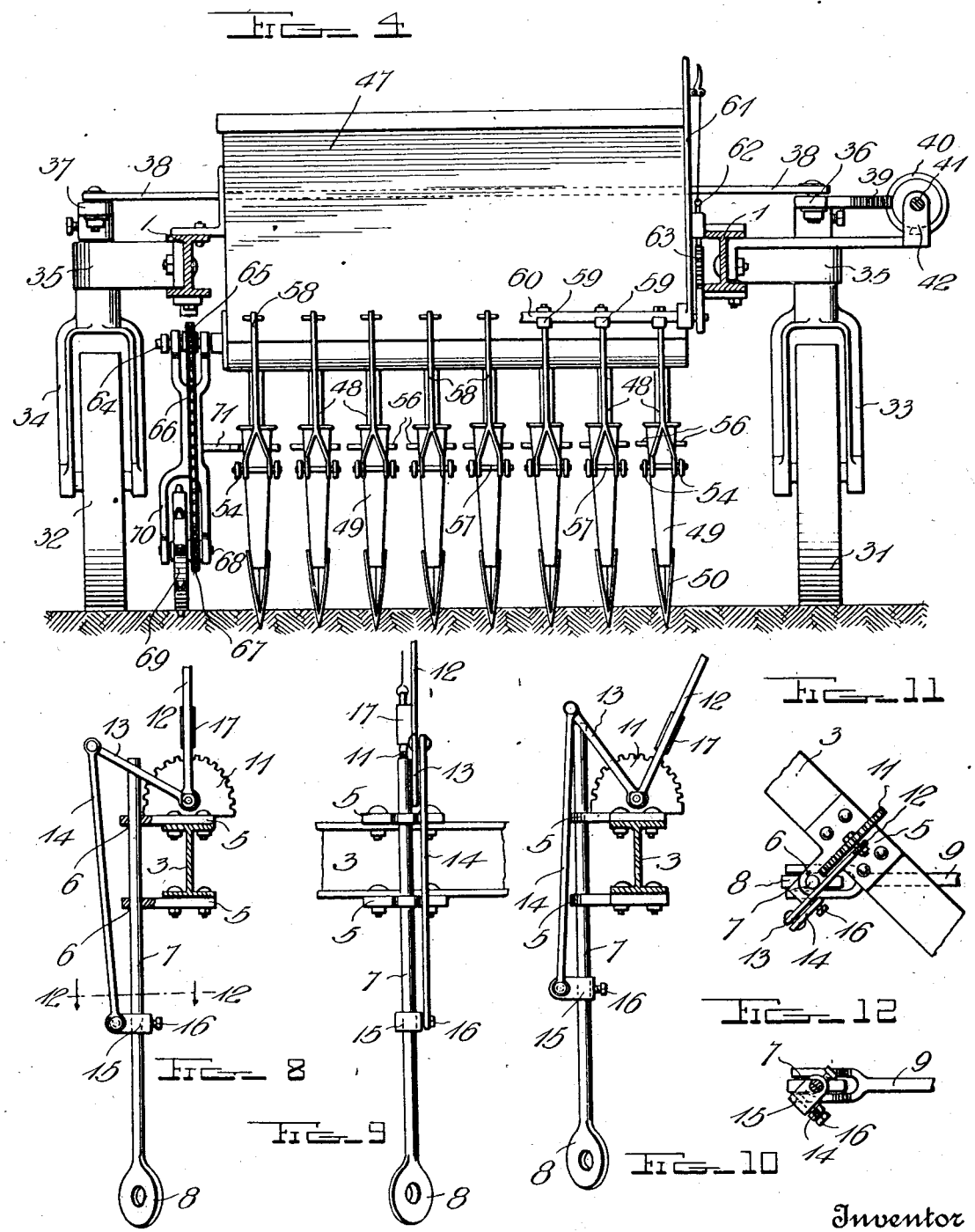

OTTO R. SCHMELING, OF WATERTOWN, SOUTH DAKOTA.

COMBINED PLOW AND SEEDING-MACHINE.

1,048,895.   Specification of Letters Patent.   Patented Dec. 31, 1912.

Application filed May 13, 1912. Serial No. 696,958.

*To all whom it may concern:*

Be it known that I, OTTO R. SCHMELING, a citizen of the United States, residing at Watertown, in the county of Codington and State of South Dakota, have invented certain new and useful Improvements in Combined Plows and Seeding-Machines; and I do declare the following to be a full, clear, and exact description of the invention, such as will enable others skilled in the art to which it appertains to make and use the same.

This invention relates to improvements in combined plows and seeding machines.

One object of the invention is to provide an improved construction and arrangement of supporting mechanism whereby the various parts of the machine are carried and operatively supported, so that when the machine is drawn along, the ground will be worked, rolled and the seeds planted and harrowed all in one operation or in one passage of the machine over the ground.

Another object is to provide a machine of this character having an improved construction and arrangement of steering mechanism and means whereby the operating devices carried thereby may be raised and lowered into and out of operative position.

With these and other objects in view, the invention consists of certain novel features of construction, and the combination and arrangement of parts as will be more fully described and claimed.

In the accompanying drawings; Figure 1 is a side view of my improved plow and seeding machine; Fig. 2 is a top plan view thereof; Fig. 3 is an enlarged side view of a portion of the supporting frame and the seeding mechanism; Fig. 4 is a vertical cross sectional view taken on the line 4—4 of Fig. 1; Fig. 5 is a similar view taken on the line 5—5 of Fig. 1; Fig. 6 is a detail vertical cross sectional view on the line 6—6 of Fig. 1 looking toward the rear end of the machine; Fig. 7 is an enlarged plan view of a portion of the supporting frame and the seeding mechanism showing more particularly the means by which the seed tubes and runners are lifted; Fig. 8 is a detail sectional view through a portion of the frame showing more particularly the means whereby the plows are adjusted for working the ground to a greater or less depth; Fig. 9 is a front view of the parts shown in Fig. 8; Fig. 10 is a view similar to Fig. 8 showing the parts in a different position; Fig. 11 is a plan view of the parts shown in Figs. 8, 9, and 10; Fig. 12 is a detail horizontal sectional view taken on the line 12—12 of Fig. 8.

My improved plow and seeding machine comprises a main supporting frame consisting of longitudinally disposed parallel side bars 1 which are preferably of eye beam form and are connected at their forward ends by an angular cross bar 2 and by obliquely disposed cross bars 3 and 4. Secured to the upper and lower sides of the front cross bar 3 are pairs of guide brackets 5 which project forwardly from and at right angles to the bar and have therein alined guide passages 6 with which are slidably engaged the upper ends of plow adjusting rods 7 having on their lower ends apertured heads 8.

To the apertured heads 8 of the adjusting rods 7 are pivotally connected the forward ends of the beams 9 of a series of plows 10. The plows 10 may be of any desired construction and by attaching the beams thereof to the rods 7 which are carried by the obliquely disposed cross bar 3 said plows will be arranged in an oblique line beneath the frame of the plow or one ahead of the other as shown. By connecting the forward ends of the plow beams to the rods 7 as herein shown and described, the plows will be drawn along with the machine and in order to regulate the depth at which the plows work the ground, I provide means for adjusting the forward ends of the plow beams, said means comprising segmental rack plates 11, one of which is secured to each of the guide brackets 5 on the upper side of the cross bar 3 and to each of which is pivoted an adjusting lever 12 having on its lower end a forwardly projecting crank arm 13 the outer end of which is connected by a depending link 14 to a clip 15 which embraces and is adjustably secured to the rod 7 by a set screw 16. By thus connecting the levers 12 with the draft and adjusting rods 7 of the plows it will be obvious that when said levers are rocked in one direction or the other the forward end of the beams will be raised and lowered and the points of the plows thus turned downwardly into the ground to a greater or less extent. The levers 12 are provided with suitable pawls 17 which are adapted to engage the racks 11 and thereby hold the rods 7 and the plows in their adjusted positions. By providing a separate draft and adjusting mechanism for each of the plows it will be seen that the various plows may be given different adjustments or all may be adjusted to plow alike.

In order to raise the plows bodily above the ground to facilitate the moving of the machine from one place to another, I provide a plow lifting mechanism comprising a rock shaft 18 which is revolubly mounted in suitable bearings 19 on the cross bar 4 of the main frame and on which are fixedly mounted a series of right angular forwardly projecting crank arms 20, the forward ends of which are connected by chains 21 or other flexible connections to the plow beams as shown. On one end of the shaft 18 is arranged an upwardly projecting crank arm 22 which is connected by a rearwardly projecting operating rod 23 to a plow lifting lever 24 which is pivotally connected to a segmental rack plate 25 secured to the step 26 on which the operator stands, at the rear end of the machine. The lever 25 is provided with a suitable pawl 27 adapted to engage the teeth of the rack 25 whereby when the lever is operated to rock the shaft 18 and thereby raise the plows, said lever may be locked to hold the plows in an elevated position.

While I have herein shown and described the entire series of plows as being simultaneously raised and lowered by a single rock shaft and operating lever, it is obvious that this shaft and lever may be duplicated and one or more of the plows raised and lowered independently of the other plows.

The main frame of the machine is supported at its forward end by a caster wheel 28, the standard 29 of which is loosely mounted in a vertical bearing standard 30 secured to the front cross bar 2 of the frame. The main frame is further supported intermediate its ends by steering wheels 31 and 32 which are mounted in the forked lower ends of standards 33 and 34 the upper ends of which are pivotally engaged with bearing brackets 35 secured to and projecting laterally from the side bars 1 of the main frame as shown. The upper ends of the standards 33 and 34 project above the brackets 35 and are squared as shown. On the squared upper end of the standard 33 is fixedly mounted a crank arm 36, while on the squared upper end of the standard 34 is fixedly mounted a crank arm 37. The crank arms 36 and 37 are connected to turn in unison by a connecting bar 38 which extends across the top of the machine as shown. On the crank arm 36 is arranged a segmental worm gear 39 with which is engaged a worm 40 on the forward end of a worm operating shaft 41 journaled in suitable brackets 42 projecting from the adjacent side bar of the main frame as shown. On the rear end of the worm operating shaft 41 is fixedly mounted a hand wheel 43 which is disposed in convenient reach of the operator standing on the step 26. By thus arranging the steering wheels 31 and 32 and providing an operating mechanism as herein shown and described, it will be seen that said wheels may be readily turned by the operator to steer the machine in the desired direction.

Connected to the cross bar 4 midway between the side bars 1 of the frame is a depending draft bracket 44 to which is pivotally connected the forward end of the beam or draw bar 45 of a clod crushing, pulverizing and ground packing roller 46 the journals of which are revolubly mounted in the rear forked end of the draw bar or beam 45 as shown.

Arranged in the rear portion of the main frame, back of the roller 46 is a seed hopper 47 having a plurality of seed discharging tubes 48 to which are connected seed conducting funnels 49 the lower ends of which are engaged with furrow opening runners 50 of the usual or any suitable construction. The forward ends of the runners 50 are connected to upwardly curved draw bars 51, the upper ends of which are connected to a cross bar 52 having its ends secured in brackets 53 depending from the side bars 1 of the main frame as shown. In order to lift the runners 50 and the lower portion or funnels 49 of the seed tubes above the ground to facilitate the removal of the machine from one place to another, I provide a suitable lifting mechanism comprising a series of lifting rods 54 which are arranged in pairs, one pair of each of said rods being pivotally connected at their forward ends to pivot pins 55 projecting laterally from the draw bars 51 of the runners. The pairs of rods engage the opposite sides of the funnels 49 immediately below transversely disposed lifting pins 56 projecting laterally from the opposite sides of the funnels as shown. The rear ends of the lifting rods 54 are connected by cross pins 57 to which are connected the lower ends of bifurcated lift rods 58, the upper ends of which are pivotally connected to the outer ends of crank arms 59 fixed on and projecting forwardly from a rock shaft 60 journaled at its ends in suitable bearing brackets on the side bars 1 of the main frame. To the shaft 60 near one end thereof is connected the lower end of an operating lever 61 which projects upwardly in convenient reach of the operator standing on the step 26 and is provided with a suitable pawl 62 adapted to engage the teeth of a segmental rack 63 whereby the rock shaft and the parts operated thereby are locked in adjusted positions for supporting the seeding mechanism in an elevated position.

The seed discharging valves of the seed hopper are operated by a shaft 64 having on one end a sprocket pinion 65 which is connected by a sprocket chain 66 to a similar pinion 67 on the shaft 68 of a ground engaging wheel 69 said shaft 68 being revolubly mounted in the forked lower end of the hanger 70, the forked upper end of which is loosely engaged with the valve operating shaft 64 as clearly shown in Fig. 4 of the drawings. By arranging the ground wheel 69 and gearing the same to the valve operating shaft 64 in the manner described, it will be seen that as the machine is drawn over the ground the movement of the wheel 69 will be imparted to the valve operating shaft to turn the same in the proper direction for operating the valves and discharging the seed from the hopper into the seed tubes 48. In order to lift the ground wheel simultaneously with the lifting of the other parts of the seeding mechanism, I provide the hanger 70 with a laterally extending lifting pin 71 which projects from the inner side of the hanger and has its inner end disposed in the path of movement of one member of the adjacent pair of lifting rods 54 whereby when said pair of rods is lifted the hanger will also be lifted, as clearly shown in Fig. 7 of the drawing.

In order to cover or work the seeds into the ground after they have been deposited by the seeding or drilling mechanism hereinbefore described, I provide a light harrow comprising a frame 72 having a series of cross bars 73 each of which is provided with a series of teeth 74. The harrow frame 72 is connected with the rear ends of the side bars 1 of the main frame by rearwardly projecting depending draft bars 75 the lower ends of which are pivotally connected to the ends of the frame 72 as shown.

By means of a machine constructed and arranged in accordance with my invention it will be seen that a field may be plowed or worked and rolled and the seeds planted and covered in an efficient and reliable manner by any one operation or in one passage of the machine over the ground, thus greatly expediting the preparation and seeding of the land. To the front cross bar 2 of the frame 1 is secured a clevis 76 to which is adapted to be connected any suitable draft device whereby the machine is connected with and drawn by a traction engine or other suitable motor.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is;

1. In a machine of the character described comprising a wheeled supporting frame, of a centrally disposed pair of steering wheels mounted upon said frame, means for operating said wheels, a guide wheel carried by the forward end of the latter, a ground engaging wheel located adjacent to the rear end of the frame, whereby the latter is properly supported and balanced, plows arranged directly in rear of the guide wheel, a land roller depending from the frame in advance of the steering wheels and assisting in supporting the frame, a seed planting mechanism arranged upon the frame and located in rear of said steering wheels, said ground wheel being operatively connected to the seed planting mechanism and arranged in such a manner as to feed the grain during the travel of the machine.

2. A machine of the character described comprising a wheeled supporting frame, a plurality of adjustably supported plows carried by the forward end of the frame, steering wheels mounted in the intermediate portion of the frame and adapted to be controlled by the operator from the rear end of the machine, a guide wheel mounted in the forward end of the frame in advance of the plows, a packing roller carried by the frame and arranged between the steering wheels and plows, a seed planting mechanism in rear of the steering wheels and adapted to feed the grain to be planted, and means for operating the said mechanism during the travel of the machine.

3. In a machine of the character described comprising a wheeled supporting frame, of a centrally-disposed pair of steering wheels mounted upon said frame, means for operating said wheels in unison, a guide wheel carried by the forward end of the frame, a ground engaging wheel located adjacent to the rear end of the frame, whereby the latter is properly supported and balanced, plows arranged directly in rear of the guide wheel, a roller depending from the frame and located between the steering wheels, whereby the central portion of the frame is properly supported when guided, a seed planting mechanism arranged upon the frame and located in rear of said steering wheels, said ground wheel being operatively connected to the seed planting mechanism and arranged in such a manner as to feed the grain during the travel of the machine.

In testimony whereof I have hereunto set my hand in presence of two subscribing witnesses.

OTTO R. SCHMELING.

Witnesses:
L. T. MORRIS,
A. C. WALLACE.